April 3, 1945.  J. C. RENAULT  2,372,739
PLANTING MACHINE
Filed April 1, 1944  3 Sheets-Sheet 1

INVENTOR
J. C. Renault
BY
ATTYS.

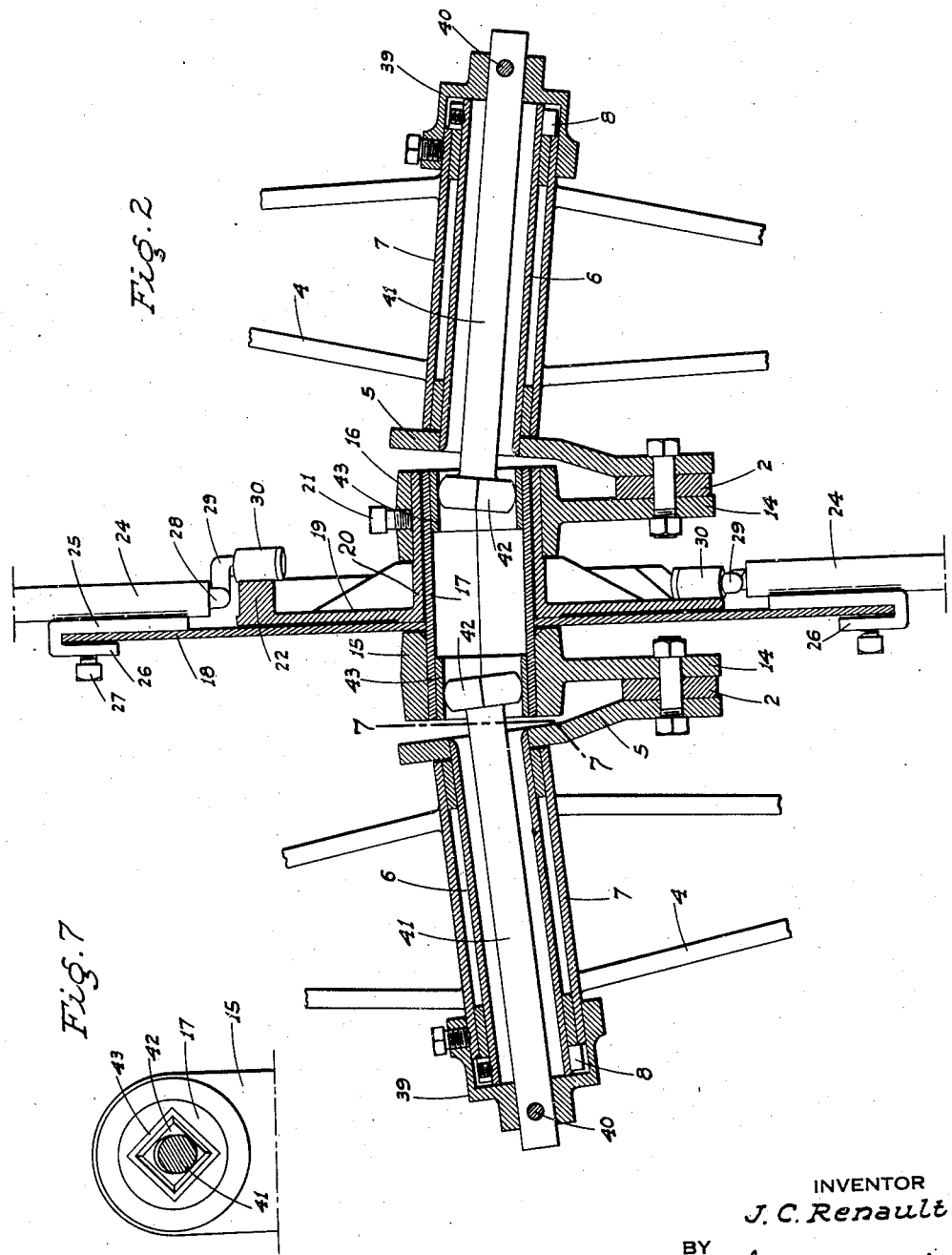

April 3, 1945.   J. C. RENAULT   2,372,739
PLANTING MACHINE
Filed April 1, 1944   3 Sheets-Sheet 3
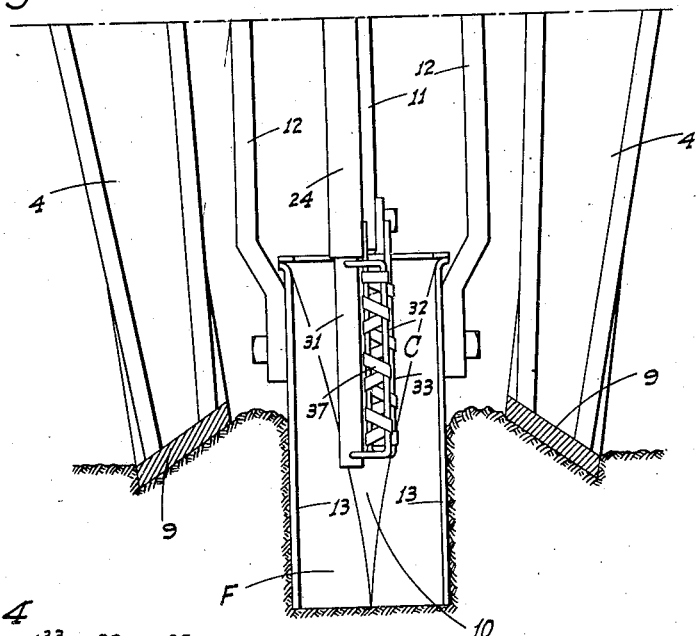
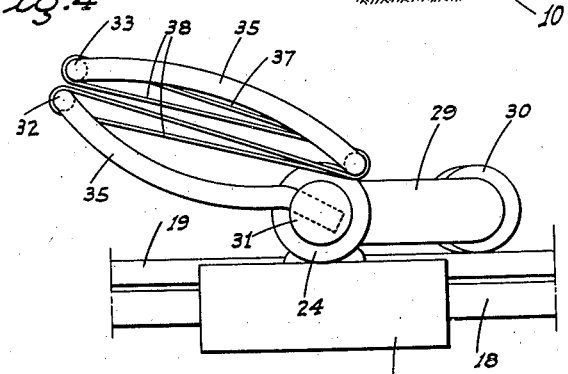
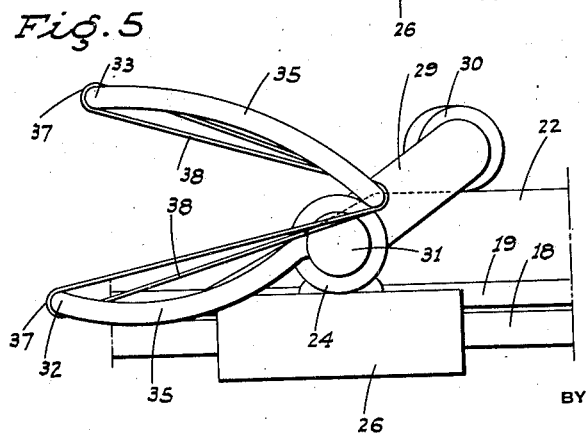
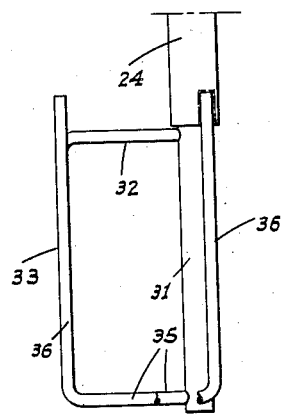
INVENTOR
J. C. Renault
BY
ATTORNEYS Patented Apr. 3, 1945

2,372,739

UNITED STATES PATENT OFFICE 2,372,739

PLANTING MACHINE

Jean C. Renault, Salinas, Calif., assignor to Farmers Mercantile Company, Salinas, Calif., a corporation of California Application April 1, 1944, Serial No. 529,120

11 Claims. (Cl. 111—3)

This invention relates to, and it is an object to provide, an improved row crop planter for the purpose of mechanically setting out nursery grown plants in predetermined spaced relation in field rows; the implement being progressively operative, upon advance thereof along the row, to open a furrow, deposit plants in the furrow in equally spaced relation, and to then close the furrow about the plant roots.

A further object of the invention is to provide a planter in which the spacing of the plant holding units or clamps is adjustable, whereby the spacing between plants deposited in the crop row can be selectively regulated, i. e. the correct spacing for a given crop can be obtained.

An additional object of this invention is to provide a planting machine which includes plant holding units or clamps, and cam actuated operating means therefor, of novel construction.

A further object of the invention is to produce a planting machine which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged fragmentary cross section, taken axially through the machine.

Figure 3 is an enlarged fragmentary cross section on line 3—3 of Fig. 1.

Figure 4 is an enlarged end view of one of the clamps in closed or plant holding position.

Figure 5 is a similar view but showing the clamp in open or plant release position.

Figure 6 is a fragmentary elevation of one of the clamps with the elastic band removed, and with the fixed frame partially broken away.

Figure 7 is a cross section on line 7—7 of Fig. 2.

Figure 1:
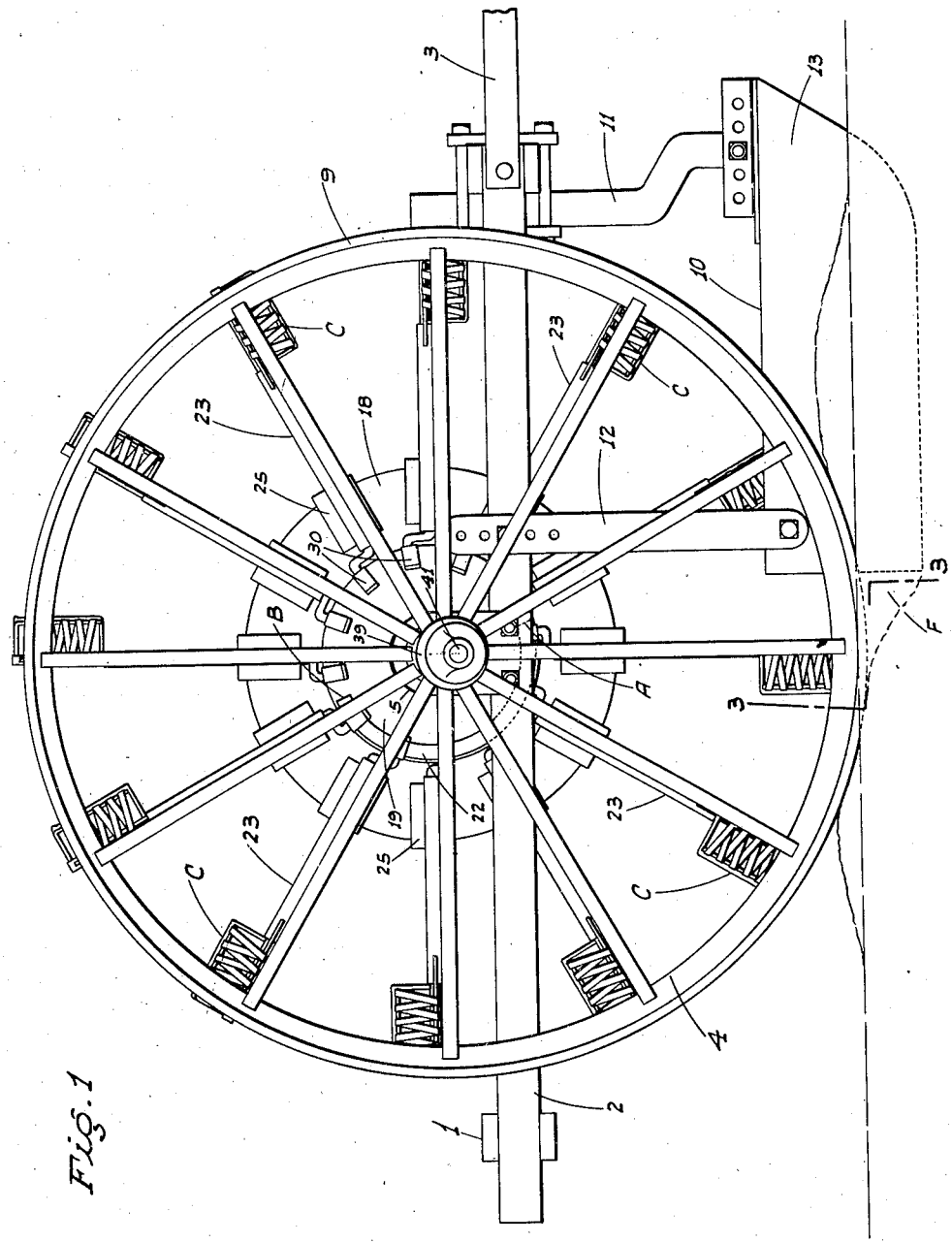
Figure 1 is a side elevation of the improved planting machine.

Referring now more particularly to the characters of reference on the drawings, the implement comprises a main frame, indicated generally at 1, disposed substantially horizontally above and for movement along the ground; such frame including transversely spaced frame beams 2 and a draft bar 3 for connection with a draft implement.

Intermediate its ends the frame 1 is supported by a pair of transversely spaced, relatively large diameter ground engaging wheels 4 which are canted laterally into downwardly converging relation, as shown; such wheels being supported from the frame as follows:

A pair of upwardly and outwardly diverging brackets 5 are fitted, adjacent their upper ends, with outwardly and oppositely projecting tubular spindles 6, which spindles are disposed at an outward and downward slope. The wheels 4 include hubs 7 which are rotatably mounted on the spindles 6. The hubs 7 are held against escape from the tubular spindles 6 by means of locking rings 8 secured to the latter.

The wheels 4 include flat rims 9 of substantial width which are disposed in outwardly and diverging relation for the purpose as will hereinafter appear; said rims 9 being spaced apart a distance slightly greater than the width at its rear end of a furrow opening shoe 10 which is adjustably supported from the frame 1 by means of standards 11 and 12. The furrow opening shoe is normally disposed so that its rear end is slightly ahead of the vertical center line of wheels 4, and is adjustably set to open a furrow of a predetermined depth. The shoe 10 is of generally conventional construction, being open on top, and including transversely spaced side plates or wings 13.

The planting mechanism which the implement incorporates comprises the following:

A pair of brackets 14 are fixed on and upstand from the frame beams 2 in corresponding relation to the brackets 5, but on the opposite sides of said beams. The brackets 14 are formed at their upper ends with annular axially alined bearings 15 and 16 in which a rotary hub 17 is supported, said hub having a relatively large diameter, radially projecting disc 18 fixed thereon adjacent the bearing 15.

Another but relatively smaller disc 19 is disposed in face to face relation with the disc 18, and includes a normally stationary but rotatably adjustable hub 20 which projects into the bearing 16, and forms a portion of the bearing for rotary hub 17. The hub 20 is normally held against rotation by releasable means such as a set screw 21. The disc 19 includes a side working cam 22 which projects laterally out from said disc in a direction away from the disc 18. The cam 22 is of part-circle or limited arcuate configuration and includes a head end A and a rear end B. This cam functions to open and close the plant holding units or clamps, which are constructed and function as follows:

The disc 18, which is rotated from the wheels 4 in the same direction and at the same speed by drive means hereinafter described, supports a plurality of circumferentially spaced, radially projecting plant holding units, indicated generally at 23. Each of these plant holding units comprises a tubular arm 24 fixed adjacent its inner end with an attachment plate 25 secured in face to face relation with the peripheral portion of disc 18 by means of a securing yoke 26 retained in place by a set screw 27. By reason of the above method of attachment the units 23 can be spaced about the disc 18 as desired. An actuating shaft 28 extends through each tubular arm 24 and projects beyond opposite ends thereof. At the inner end each shaft 28 is formed with a crank 29, which carries a roller 30 adapted to engage and ride the cam 22.

The outer end of each shaft 28 projects some distance beyond the adjacent end of the corresponding tubular arm 24, such outwardly projecting portion, as clearly shown in Fig. 6, being indicated at 31. Plant holding clamps C are included at the outer end of the units 23 and each clamp comprises cooperating, substantially rectangular skeleton frames, indicated at 32 and 33, fixed in connection with the shaft portion 31 and the adjacent end of the tubular arm 24, respectively. The frames 32 and 33 substantially match and are normally disposed in closed relation and extend or face in the direction of rotation of the disc 18 and wheels 4. The frames 32 and 33 comprise outer side rods 34 and corresponding end rods 35, the latter being bowed away from each other. The frame 33 also includes an inner side rod 36 fixed to the tubular arm 24 parallel to but spaced from shaft portion 31.

A length of elastic band or ribbon 37 is wound on the frames 32 and 33 with loops 38 of said ribbon extending alternately from the inner side rod 36 of frame 33 to the outer side rods 34 of both the frames; the loops corresponding to each frame being spaced apart but extending substantially from end to end thereof. It will be seen that when the frames 32 and 33 are in closed position, adjacent portions of the loops 38 corresponding to the separate frames are closely disposed, whereby a plant can be frictionally engaged therebetween; the bow of the end rods 35 permitting a plant to project beyond either end of the clamp.

The loops 38 of the elastic ribbon 37 are under tension and normally tend to swing the frames 32 and 33 to closed position, as shown in Fig. 4, and accomplish this result when the rollers 30 are free of the cam 22. However, when the rollers 30 engage and ride the cam 22, the cranks 29 function to turn the shafts 28 in a direction to swing the corresponding frame 32 away from the cooperating frame 33, thus opening the clamps C; the cam being of an arcuate extent and disposed so that said clamps open at a point immediately ahead of the point of ground contact of wheels 4, and then remain open only to a point adjacent but above the frame in the upward path of movement of said clamp.

The drive mechanism for the clamp supporting disc 18 comprises the following:

The hub 7 of each wheel 4 is provided with a fixed cap 39 which is connected by means of a cross pin 40 with a stub shaft 41 which extends through the tubular spindle 6. At the inner end of each stub shaft 41 it is formed with an integral rectangular head 42 whose edges are rounded, as shown, and which head engages in a matching rectangular socket 43 fixed in the adjacent end of the rotary hub 17. It will thus be seen that with rotation of the wheels 4 a positive drive is imparted therefrom to the rotary hub 17, and consequently to the clamp supporting disc 18.

Operation

In operation, an operator sits upon a seat (not shown) supported by the main frame 1 rearwardly of the wheels 4; such seat being disposed so that the worker faces forwardly. With advance of the implement the worker deposits a plant in each of the clamps C as the same are moving in their upward path of movement and prior to the time that said clamps close upon the corresponding roller escaping the rear end B of cam 22. The plants are placed in the clamps C with the roots outermost and projecting out some distance from said clamps.

The clamps, with the plant engaged therein, then continue their rotary movement to a point immediately adjacent the point of ground contact of the wheel rims 9. Here the clamps C open, for the reason that the rollers engage the head end A of cam 22 and ride upon the latter, opening said clamps and depositing the plants, roots lowermost, in the furrow F, which is opened by the shoe 10. Immediately after being deposited in such furrow the furrow is closed and the earth compacted around the plants by the outwardly and diverging rims 9 of wheels 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a planting machine, a frame supported, rotary planting mechanism comprising a rotary disc, a plurality of plant holding units radiating from the disc in circumferentially spaced relation, said units each having a clamp on the outer end adapted to releasably engage a plant, and means operative upon rotation of the disc to open and close said clamps at predetermined points in the path of rotation thereof; said clamp actuating means comprising a turnable shaft included in each unit, a crank on the inner end of each shaft, and a cam fixed adjacent said disc and with which cam the cranks cooperatingly engage in shaft turning relation upon rotation of the disc.

2. A planting mechanism as in claim 1 including a normally fixed but rotatably adjustable disc mounted adjacent the rotary disc; said cam being on said normally fixed disc.

3. In a planting machine, a frame supported, rotary planting mechanism comprising a rotary disc, a plurality of plant holding units radiating from the disc in circumferentially spaced relation, said units each having a clamp on the outer end adapted to releasably engage a plant, and means operative upon rotation of the disc to open and close said clamps at predetermined points in the path of rotation thereof; said clamp actuating means comprising a radial shaft included in each plant holding unit, a crank in the inner end of each shaft, a normally fixed disc mounted adjacent and in facing relation to said rotary disc, and a side working cam of limited arcuate extent on said normally fixed disc, the cranks cooperating.

4. In a planting machine, a frame supported, rotary planting mechanism comprising a rotary disc, a plurality of plant holding units radiating from the disc in circumferentially spaced relation, said units each having a clamp on the outer end adapted to releasably engage a plant, and means operative upon rotation of the disc to open and close said clamps at predetermined points in the path of rotation thereof; each of said clamps comprising a pair of cooperating skeleton frames extending in the direction of rotation, means mounting said frames for relative lateral swinging movement between open and closed positions, and loops of elastic ribbon extending from side to side of each frame, the loops of the separate frames cooperating, when the latter are closed, in plant holding relation.

5. In a planting machine, a frame supported, rotary planting mechanism comprising a rotary disc, a plurality of plant holding units radiating from the disc in circumferentially spaced relation, said units each having a clamp on the outer end adapted to releasably engage a plant, and means operative upon rotation of the disc to open and close said clamps at predetermined points in the path of rotation thereof; each of said clamps comprising a pair of substantially rectangular, cooperating skeleton frames extending in the direction of rotation, said frames including corresponding outer side rods and end rods, means mounting said frames for relative swinging movement between open and closed positions, and loops of elastic ribbon extending from side to side of each frame whereby the loops of the separate frames cooperate in plant holding relation when said frames are closed, corresponding end rods of said frames being bowed outward relative to each other.

6. In a planting machine, a frame supported, rotary planting mechanism including a plurality of circumferentially spaced radial arms, said arms being tubular, a shaft in each arm and projecting beyond the ends thereof, a plant holding clamp mounted in connection with the outer end portion of each tubular arm and shaft assembly, each clamp being opened by predetermined rotation of the corresponding shaft, and means to impart such rotation to the shafts each time the corresponding clamps reach a predetermined point adjacent the ground and to then hold the clamps open through a portion only of their rotative path of movement.

7. In a planting machine, a frame supported, rotary planting mechanism including a plurality of circumferentially spaced radial arms, said arms being tubular, a shaft in each arm and projecting beyond the ends thereof, a plant holding clamp mounted in connection with the outer end portion of each tubular arm and shaft assembly, each clamp being opened by predetermined rotation of the corresponding shaft, and means to impart such rotation to the shafts each time the corresponding clamps reach a predetermined point adjacent the ground and to then hold the clamps open through a portion only of their rotative path of movement; each clamp comprising a pair of substantially rectangular, cooperating skeleton frames extending in the direction of rotation, each frame including an outer side rod and end rods, the end rods of one frame being fixed to the projecting outer end portion of the corresponding shaft, the other frame including an inner side rod secured in fixed connection at one end with the tubular arm, and a plurality of spaced loops of elastic ribbon extending from the outer side rod of each frame to the inner side rod of said other frame.

8. A rotary planting mechanism as in claim 7 in which the corresponding end rods of said frames are bowed outwardly relative to each other.

9. A rotary planting mechanism as in claim 7 in which the clamps, when open, face in the direction of rotation of said mechanism.

10. In a planting machine, a longitudinally extending frame, a rotary planting mechanism mounted on the frame, said mechanism including a transversely extending open ended hub, a pair of ground engaging wheels jouurnaled in connection with the frame independent of the hub and beyond the ends thereof, and a drive coupling between each wheel and the hub, each coupling comprising a stub shaft fixed with the wheel and projecting into the adjacent end of the hub, a non-circular socket in each end of the hub, and a matching head on the inner end of each shaft seated in the adjacent socket.

11. In a planting machine, a longitudinally extending frame, a rotary planting mechanism mounted on the frame, said mechanism including a transversely extending open ended hub, a pair of ground engaging wheels journaled in connection with the frame and dependent of the hub and beyond the ends thereof, and a drive coupling between each wheel and the hub, each coupling comprising a stub shaft fixed with the wheel and projecting into the adjacent end of the hub, a non-circular socket in each end of the hub, and a matching head on the inner end of each shaft seated in the adjacent socket; the wheels being canted inwardly at the bottom and said shafts being upwardly inclined toward their inner ends, said heads being rounded transversely at their peripheries.

JEAN C. RENAULT.